UNITED STATES PATENT OFFICE.

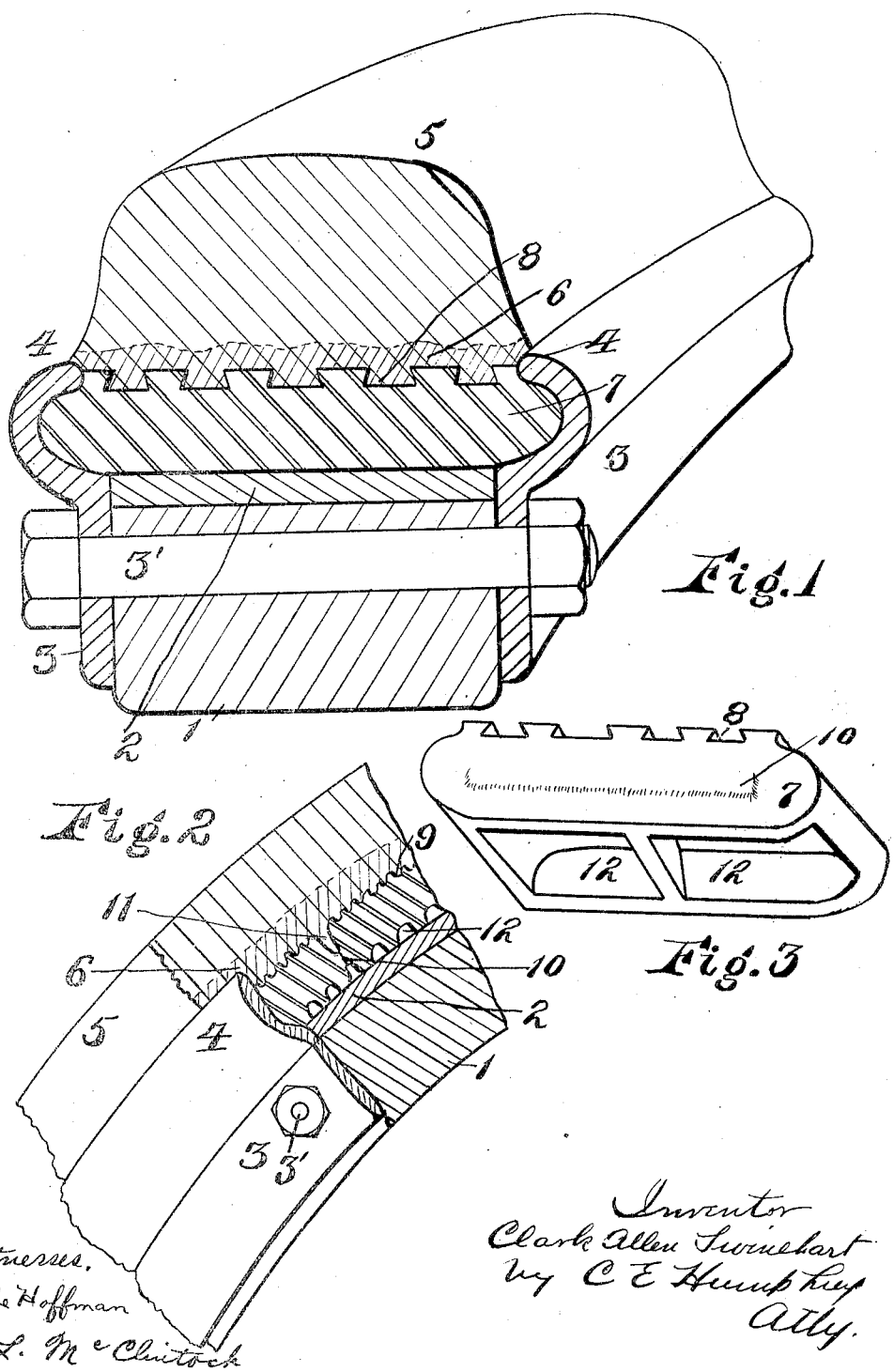

CLARK ALLEN SWINEHART, OF AKRON, OHIO.

VEHICLE-TIRE.

1,089,020.  Specification of Letters Patent.  Patented Mar. 3, 1914.

Application filed January 24, 1913.  Serial No. 743,930.

*To all whom it may concern:*

Be it known that I, CLARK ALLEN SWINEHART, a citizen of the United States, residing at Akron, in the county of Summit and State of Ohio, have invented new and useful Improvements in Vehicle-Tires, of which the following is a specification.

This invention relates to improvements in elastic tires for vehicles, more especially of the solid type.

The objects of the invention are to provide a solid tire provided with a base which will securely anchor the tire in a clencher wheel rim, the construction of the base admitting a considerable degree of flexibility of the tire in cases where the base is provided with a layer of hard rubber so as to permit the more ready seating of the tire on the rim. More specifically, this object is accomplished by inserting in the base of the tire a circumferentially-extending series of metal blocks to which the tire is caused to adhere by vulcanization, said blocks being of such a size as to permit a reasonable amount of bending of the tire and also having their lateral faces so fashioned as to be engaged by the clencher flanges of a rim, whereby the pressure of the rim is exerted on the metal, thereby permitting the ready removal of the tire from the rim when one of the clencher flanges is removed to subserve the same function, in effect, as is accomplished by a demountable rim carrying an auxiliary tire.

A further and very important object is that by incorporating in the base of the tire a plurality of metal blocks which are of extremely cheap construction and of cast metal, and to which the rubber adheres tightly, the blocks can be reclaimed or saved, when the tire is worn out, and used over again without loss. This saves the employment of expensive rubber in the base of the tire by using a cheaper material and these blocks are in no wise injured by use so as to be incapable of reuse.

With the foregoing and other objects in view, the invention consists in the novel construction, combination and arrangement of parts constituting the invention to be hereinafter specifically described and illustrated in the accompanying drawings which form a part hereof wherein is shown the preferred embodiment of the invention, but it is to be understood that changes, variations and modifications can be resorted to which come within the scope of the claims hereunto appended.

In the drawings in which similar reference numerals indicate like parts in the different figures, Figure 1, is a perspective view of a section of the rim portion of a vehicle wheel with my improved tire mounted thereon, the rim and tire being shown in section; Fig. 2, is a view partly in side elevation and partly in section of the device shown in Fig. 1; and, Fig. 3, is a perspective view of one form of metallic block employed in this form of tire.

Referring to the drawings more particularly, the reference numeral 1 denotes the felly of an ordinary vehicle wheel on which is mounted a felly-band 2 forming a seat for a tire. Secured by bolts 3' to the lateral faces of the felly 1 are annular bands 3 provided with outwardly-extending and laterally-inwardly turned clencher flanges 4 of the conventional form used in flanges of this character.

The tire which forms the main feature of this invention consists of, an outer body of rubber or other material 5, formed with a tread and base and the base is preferably provided with a continuous circumferentially-extending layer of hard rubber 6 united with the soft rubber by vulcanization. In the base of the tire are a plurality of elements 7 each of which is provided on its outer face with a series of grooves preferably dove-tailed in cross section and extending circumferentially of the rim as shown in Figs. 1 and 3 or transversely thereof as shown in Fig. 2. The ends of each of the elements 7 are preferably provided with projecting bosses 10 so that when the elements 7 are arranged end to end in the base of the tire, the bosses 10 will contact and leave a considerable space 11 between the blocks into which the rubber of the tire may enter to form to a certain extent a cushioned joint between them. The elements 7 are further preferably provided on their under faces with recesses or pockets 12, either extending longitudinally, as shown in Fig. 3, or transversely, as shown in Fig. 2.

In constructing the tire the blocks will be arranged on a suitable mandrel with the bosses 10 thereof in approximately contacting relation and extending circumferentially in a series throughout the mandrel and are held in place by temporary retaining bands somewhat similar to the clencher flanges 4.

The tire consisting of the hard rubber base 6 and tread portion 5 is built up thereon, after which the temporary side bands are removed and the tire placed in a mold and cured, thereby uniting the tread 5 to the hard rubber base 6 and the latter to the elements 7. Of course it will be obvious that the surfaces of the grooves 8, which ever way they are arranged may be roughened to cause the rubber to adhere more intimately therewith, but as these elements are usually formed of cast metal, the roughness formed during the casting operation effects a ready union with the rubber.

When the tire is constructed, it possesses a considerable degree of flexibility sufficient to enable it to be seated upon a rim without the necessity of employing a press or other power, and when the clencher flanges 4 are positioned they engage the metal snugly to prevent creeping of the tire without undue wear or injury to the rubber, at the same time firmly holding the tire in its seat on the rim. When the tire has become worn out, the rubber is readily stripped from the elements 7 and they may be reused without loss.

It will further be noted that by incorporating the elements 7 in the base of the tire the use of a vast amount of valuable and high-priced rubber is obviated.

I claim:—

An elastic vehicle tire adapted to be held on a wheel rim by means of clencher flanges, and embodying a continuous tread and base, the latter having incorporated therein a circumferentially-extending series of individual metallic blocks with their inner faces fitting snugly on the outer face of the rigid felly-band, said blocks extending from side to side of said tire and projecting laterally therebeyond and with their lateral projecting faces convexed to receive the clencher flanges, provision being made at the ends of said blocks for the material of the tire body to extend between the individual blocks to thereby form a flexible base for said tire and possess sufficient rigidity to be non-compressible when grasped by the clencher flanges of the wheel.

In testimony whereof I have hereunto set my hand in presence of two subscribing witnesses.

CLARK ALLEN SWINEHART.

Witnesses:
C. E. HUMPHREY,
A. L. McCLINTOCK.